United States Patent
Cantu' et al.

(10) Patent No.: US 9,533,458 B2
(45) Date of Patent: Jan. 3, 2017

(54) PROCESS AND APPARATUS FOR MANUFACTURING A REINFORCING STRUCTURE OF A TYRE FOR VEHICLE WHEELS

(75) Inventors: Marco Cantu', Milan (IT); Stefano Sangiovanni, Milan (IT); Walter Mandelli, Milan (IT)

(73) Assignee: Pirelli Tyre S.p.A., Milan (IT)

(*) Notice: Subject to any disclaimer, the term of this patent is extended or adjusted under 35 U.S.C. 154(b) by 92 days.

(21) Appl. No.: 13/992,434

(22) PCT Filed: Dec. 5, 2011

(86) PCT No.: PCT/IB2011/002924
§ 371 (c)(1),
(2), (4) Date: Jul. 9, 2013

(87) PCT Pub. No.: WO2012/080797
PCT Pub. Date: Jun. 21, 2012

(65) Prior Publication Data
US 2013/0276956 A1 Oct. 24, 2013

Related U.S. Application Data

(60) Provisional application No. 61/452,300, filed on Mar. 14, 2011.

(30) Foreign Application Priority Data

Dec. 14, 2010 (IT) .............................. RM2010A0657

(51) Int. Cl.
*B29D 30/16* (2006.01)
*B29D 30/30* (2006.01)
(Continued)

(52) U.S. Cl.
CPC .............. *B29D 30/30* (2013.01); *B29D 30/14* (2013.01); *B29D 30/1657* (2013.01); *B29D 30/70* (2013.01)

(58) Field of Classification Search
CPC .............. B29D 30/1642; B29D 30/165; B29D 30/1657; B29D 30/3042; B29D 30/305; B29D 30/3057; B29D 30/70; B29D 2030/082; B29D 2030/3092; B29D 2030/705
See application file for complete search history.

(56) References Cited

U.S. PATENT DOCUMENTS 5,041,179 A * 8/1991 Shinno et al. .................. 156/64
6,355,126 B1 * 3/2002 Ogawa ............... B29D 30/1657
156/117

(Continued)

FOREIGN PATENT DOCUMENTS

EP        1 595 693 A1    11/2005
WO   WO 01/38077 A1     5/2001
(Continued)

OTHER PUBLICATIONS

Optimal Trajectory Planning for Spray Coating John Antonio IEEE, 2004, pp. 2570-2577.*

(Continued)

*Primary Examiner* — Martin Rogers
(74) *Attorney, Agent, or Firm* — Finnegan, Henderson, Farabow, Garrett & Dunner, L.L.P.

(57) ABSTRACT

A process for manufacturing a reinforcing structure of a tire for vehicle wheels, is carried out on a toroidal support including an outer surface, by means of at least one laying element, which can be oriented in space in a controlled way; the laying element including a laying surface adapted to act on a portion of a rubberized strip-like element for laying the same on the outer surface of the toroidal support. The reinforcing structure includes at least a first and a second radially superimposed reinforcing layers, each including a plurality of strip-like elements; each reinforcing layer having a circumferential extension about a rotation axis of the tire and comprising thread-like reinforcing elements, arranged parallel to one another. The layers are arranged so that the reinforcing thread-like elements of the first reinforcing layer are oriented obliquely with respect to the (Continued)

equatorial plane of the tire, and that the reinforcing thread-like elements of the second reinforcing layer also have an oblique orientation, crossed with respect to the thread-like elements of the first layer.

13 Claims, 8 Drawing Sheets

(51) Int. Cl.
    *B29D 30/14*    (2006.01)
    *B29D 30/70*    (2006.01)

(56) References Cited

U.S. PATENT DOCUMENTS

| | | | |
|---|---|---|---|
| 6,369,353 B1* | 4/2002 | Soska | 219/121.68 |
| 6,702,913 B2* | 3/2004 | Marchini et al. | 156/117 |
| 7,344,614 B2* | 3/2008 | Yovichin | B29D 30/1657 156/117 |
| 2004/0093119 A1* | 5/2004 | Gunnarsson et al. | 700/245 |
| 2004/0154727 A1* | 8/2004 | Weissert et al. | 156/117 |
| 2005/0269014 A1 | 12/2005 | Mizota | |
| 2007/0199661 A1* | 8/2007 | Nicolas et al. | 156/361 |
| 2010/0193109 A1* | 8/2010 | Cantu' et al. | 156/117 |
| 2010/0200152 A1* | 8/2010 | Marchini et al. | 156/117 |
| 2010/0286808 A1* | 11/2010 | Wyatt et al. | 700/97 |

FOREIGN PATENT DOCUMENTS

| | | |
|---|---|---|
| WO | WO 2008/015486 A1 | 2/2008 |
| WO | WO 2009/033493 A1 | 3/2009 |
| WO | WO 2009/034400 A1 | 3/2009 |

OTHER PUBLICATIONS

Computational Geometry: Algorithms and Applications Berg et al Springer, 2008, pp. 283-306.*
International Search Report from the European Patent Office for International Application No. PCT/IB2011/002924, mailing date Feb. 24, 2012.

* cited by examiner

PROCESS AND APPARATUS FOR MANUFACTURING A REINFORCING STRUCTURE OF A TYRE FOR VEHICLE WHEELS

FIELD OF THE INVENTION

The present invention relates to a process and an apparatus for manufacturing a reinforcing structure of a tyre for vehicle wheels, particularly a process and an apparatus for manufacturing a reinforcing structure of a tyre for vehicle wheels on a toroidal support.

PRIOR ART

In the technical field of the processes for producing tyres, documents WO2009/033493, WO2009/034400 and WO2008/015486 relate to processes for producing reinforcing structures for tyres manufactured on toroidal supports.

SUMMARY OF THE INVENTION

Reinforcing structures, such as the belt structure of a vehicle, may consist of at least two radially superimposed layers, each comprising an elastomeric material reinforced with cords arranged parallel to one another, said layers being arranged so that the cords of the first layer are oriented obliquely with respect to the equatorial plane of the tyre, whereas the cords of the second layer also have an oblique orientation, but crossed with respect to cords of the first layer (the so-called "crossed belt").

The Applicant has noted that the laying of strip-like elements carried out for manufacturing a so-called "crossed belt" on a toroidal support according to the teachings of the prior art is particularly difficult in the case of motorcycle tyres, because of the high curvature of such tyres.

Furthermore, the Applicant has noted that in order to properly lay a rubberized strip-like element on a toroidal support for manufacturing a so-called "crossed-belt" it would be necessary to keep the contact between the strip-like element and the outer surface of the toroidal support continuously and precisely, along the whole laying path of the strip-like element itself.

However, the Applicant has observed that with the known apparatuses and processes, for example those mentioned above, although it is basically possible to keep the contact between strip-like element and outer surface of the toroidal support, it is not possible to control such a contact along the whole laying path of the strip-like element, because of some physical limitations.

In particular, the Applicant has observed that, because of the high curvature of the toroidal support, when the laying element comes, along its path, to lay the strip-like element in proximity of the axially outer portions of the toroidal support, problems arise in effectively carrying out the laying.

This critical aspect is emphasized when strip-like elements having reinforcing elements of textile type are used.

The known processes and apparatuses are in fact mainly concerned about controlling the contact between laying element and outer surface of the toroidal support, trying to overcome the difficulties in following a precise laying path, by means of a deformation imposed to a presser element of the laying apparatus.

Alternatively, the contact between laying element and outer surface of the toroidal support is sought by moving the latter with great difficulty in controlling the movement of a large and relatively heavy element such as the toroidal support.

The known processes and apparatuses may cause the accuracy in following the predetermined laying path to be lost and an inadequate adhesion of the strip-like elements to the outer surface of the toroidal support.

The Applicant has even conceived to manufacture a plurality of preformed strip-like elements giving each of such strip-like elements, in advance, the proper spatial shape that has to be taken after the laying and giving each strip-like element enough elastic deformability to allow it to be laid in the proper position on the toroidal support.

This idea turned out to be not feasible from the technological point of view, particularly with strip-like elements comprising textile reinforcing elements.

Nevertheless, it has allowed the Applicant to perceive that the problem of the proper laying of the belt layers of a tyre may be solved by controlling the laying of the strip-like element so that the same is carried out according to a predetermined shape.

The Applicant has found that by means of a process and an apparatus which allow the orientation and position of the laying element to be controlled in such a way that, during the laying of a rubberized strip-like element on the outer surface of the toroidal support, the orientation of the laying element, and thus of the strip-like element to be laid, is controlled and predetermined in each point of the laying path, it is possible to form belt layers substantially without losing laying accuracy on the whole toroidal support.

The Applicant has further noted that, for an optimal laying, the contact between strip-like element and surface of the toroidal support should be maintained, besides continuously, also according to a predetermined orientation depending on the position along the outer surface of the toroidal support.

According to a first aspect thereof, the present invention relates to a process for manufacturing a reinforcing structure of a tyre for vehicle wheels, on a toroidal support comprising an outer surface, by means of at least one laying element; said laying element comprising a laying surface adapted to act on a portion of a rubberized strip-like element for laying the same on the outer surface of the toroidal support;

said reinforcing structure comprising at least a first and a second radially superimposed reinforcing layers;

each reinforcing layer comprising reinforcing thread-like elements;

said reinforcing layers being arranged so that the reinforcing thread-like elements of the first reinforcing layer are oriented obliquely with respect to the equatorial plane (Y-Y) of the tyre, and the reinforcing thread-like elements of the second reinforcing layer also have an oblique orientation, crossed with respect to the thread-like elements of the first layer;

said process comprising:

a) providing at least one rubberized strip-like element to be laid on the outer surface of the toroidal support, said at least one rubberized strip-like element comprising said reinforcing thread-like elements arranged along the longitudinal direction of the same rubberized strip-like element;

b) predetermining for each rubberized strip-like element to be laid at least one laying path on the outer surface of the toroidal support, said laying path being defined by a sequence of predetermined points selected on as many positioning polygons, said laying path being associated with a positioning sequence of said positioning polygons, the positioning of each positioning polygon in said sequence being defined by an orientation of said positioning polygon with respect to a frame of reference and by a coordinate triad of its respective predetermined point in said frame of reference;

c) moving said at least one laying element together with the rubberized strip-like element to be laid towards the toroidal support until at least a portion of the rubberized strip-like element to be laid contacts the outer surface of the toroidal support;

d) laying said rubberized strip-like element by moving said laying element along the outer surface of the toroidal support, controlling the orientation and position of said laying element, so as to substantially match a sequence of positions and orientations of said laying surface of the laying element with said positioning sequence of said positioning polygons associated with said predetermined laying path;

e) rotating the toroidal support by a predetermined angular pitch, for making said toroidal support ready for laying a new rubberized strip-like element;

f) repeating steps a) to e) for the new strip-like element.

The present invention, in one or more preferred aspects, may comprise one or more of the features hereinafter presented.

Preferably, the tyre is a tyre for motorcycle wheels, having a curvature ratio equal to at least 0.2, preferably between 0.2 and 0.8.

Conveniently, the toroidal support has a curvature ratio greater than 0.15, even more preferably greater than 0.18-0.20.

Preferably, each position of the sequence of positions and orientations of said laying surface of the laying element may be defined by a coordinate triad of a point of said laying element with respect to a frame of reference and by a space orientation of said laying element.

Advantageously, the orientations of the polygons in the positioning sequence are predetermined so that during the laying said laying surface of the laying element substantially coincides with (or is parallel to) the plane tangent to the surface of the toroidal support in each predetermined point of the predetermined laying path.

Conveniently, the space orientation of said laying element may be defined by three angles: roll ($\alpha$), pitch ($\beta$) and yaw ($\gamma$).

Preferably, the orientation and positioning of the laying element are controlled so that the portion of the strip-like element on which the laying surface of the laying element acts is at each time substantially coincident with the positioning polygons associated with the laying path.

Preferably, the portion of the strip-like element on which the laying surface of the laying element acts is substantially tangent to the toroidal support in each predetermined point of the laying path.

Advantageously, the orientation with respect to a frame of reference of each of said positioning polygons may be defined by three angles: roll ($\alpha'$), pitch ($\beta'$) and yaw ($\gamma'$).

Conveniently, during the movement of said laying element for each position of the positioning polygons, defined on the outer surface of the toroidal support, the roll ($\alpha$), pitch ($\beta$) and yaw ($\gamma$) of the laying element are changed in a controlled way so as to be substantially the same as the roll ($\alpha'$), pitch ($\beta'$) and yaw ($\gamma'$) of said positioning polygon.

The position of each positioning polygon may be referred to in any frame of reference of space coordinates, for example Cartesian, polar or cylindrical.

As a positioning polygon, it may be considered a rectangle with one side substantially equal to the width of the strip-like element and the other side arbitrarily small or correlated with the size of the laying element in the longitudinal direction of the strip-like element.

Within the framework of the present description, the following definitions apply:

By "equatorial plane" of the tyre or of the toroidal support it is meant a plane perpendicular to the rotation axis of the tyre and dividing respectively the tyre or the toroidal support into two symmetrically equal portions.

By "curvature ratio" of the tyre it is meant the ratio between the distance of the radially highest point of the tread band from the maximum chord of the tyre, and the same maximum chord of the tyre, in a cross section of the same.

By "curvature ratio" of the toroidal support it is meant the ratio between the distance of the radially highest point of the outer surface of the toroidal support from the maximum chord of said support, and the same maximum chord of the toroidal support, in a cross section of the same.

By "circumferential" direction it is meant a direction generically directed according to the rotation direction of the tyre or of the toroidal support, or in any case only slightly inclined with respect to the rotation direction respectively of the tyre or of the toroidal support.

By "axial direction" or "axially" it is meant a direction parallel to, or in any case only slightly inclined with respect to the rotation axis of the tyre or of the toroidal support.

By "radial" or "radially" it is meant a direction substantially orthogonal to the rotation axis of the tyre or of the toroidal support.

Preferably, the step of moving the laying element towards the toroidal support is carried out so as to place, according to a predetermined orientation, a substantially central portion of the rubberized strip-like element to be laid in contact with a portion of the outer surface of the toroidal support substantially straddling the equatorial plane thereof.

Preferably, during the laying step, the laying element is moved away from the equatorial plane of the toroidal support.

Preferably, during the application step the laying element exerts a pressure on at least a portion of said rubberized strip-like element.

Conveniently, during the laying step the laying element is moved away from the equatorial plane following the curvature of the toroidal support.

Preferably, during the laying step the laying element exe exerts a pressure substantially from the central portion of the rubberized strip-like element up to an end of the strip-like element itself.

Alternatively, the laying element may be moved starting form an edge or shoulder, beginning to lay the strip-like element from an end thereof, in the direction of the equatorial plane and continuing up to the opposite edge or shoulder until the opposite end of the strip-like element is laid.

Advantageously, in order to reduce the laying time, the laying step may be carried out by two laying elements moved away from the equatorial plane of the toroidal support following the curvature of the toroidal support in directions opposite to each other.

Preferably, the two laying elements may be moved along paths substantially symmetrical with respect to the laying starting point.

Advantageously, the two laying elements may be moved independently from each other.

Advantageously, the two laying elements may be controlled so as to cover substantially symmetrical paths, but with a temporally shifted laying time.

Conveniently, each laying element may be moved by a robot arm of the anthropomorphic type movable with six degrees of freedom.

Such a choice allows, on the one side, the orientation of the laying element to be controlled point by point, on the other side the use of constructively simple laying elements.

Advantageously, the step of providing the strip-like elements is carried out by means of cutting operations sequentially carried out on at least one continuous strip-like element incorporating the thread-like elements in an elastomeric matrix.

Conveniently, each cutting operation is followed by the laying of the obtained individual rubberized strip-like element on the toroidal support.

According to a second aspect, the present invention relates to an apparatus for manufacturing a reinforcing structure of a tyre for vehicle wheels;

said tyre for vehicle wheels comprising an equatorial plane (Y-Y);

said reinforcing structure comprising at least a first and a second radially superimposed reinforcing layers obtained from a plurality of rubberized strip-like elements;

each reinforcing layer comprising reinforcing thread-like elements;

said layers being arranged so that the reinforcing thread-like elements of the first reinforcing layer are oriented obliquely with respect to the equatorial plane (Y-Y) of the tyre, and the reinforcing thread-like elements of the second layer also have an oblique orientation, crossed with respect to thread-like elements of the first layer;

said apparatus comprising:
- at least one toroidal support comprising an outer surface;
- at least one laying element comprising a laying surface adapted to act on a portion of a strip-like element for laying the same on the outer surface of the toroidal support; the space position of said laying element being definable by means of a coordinate triad in a frame of reference of a point of said laying element and by a space orientation of said laying element;
- at least one motion device of said laying element adapted to change in a controlled way said position of a point of said laying element and said space orientation of said laying element;
- at least one control device of the motion device of said laying element.

Preferably, said tyre is a tyre for motorcycle wheels having a curvature ratio equal to at least 0.2, preferably between about 0.2 and about 0.8.

Conveniently, the space orientation of said laying element may be defined by three angles: roll ($\alpha$), pitch ($\beta$) and yaw ($\gamma$).

Advantageously, the motion device is adapted to change in a controlled way the roll ($\alpha$) and/or pitch ($\beta$) and/or yaw ($\gamma$) angles of the laying element.

In order to reduce the laying time of each individual rubberized strip-like element on the toroidal support, two laying elements may be provided.

Advantageously, the motion device may comprise a robot arm of the anthropomorphic type movable with six degrees of freedom.

Preferably, two robot arms may be present, each adapted to move in a controlled way a laying element, arranged on opposite sides with respect to the equatorial plane of the toroidal support.

Conveniently, the apparatus may comprise a support frame for the motion device.

Preferably, the support frame may comprise an upper portion, extending above the toroidal support, to which the motion device is fixed.

Such a choice allows the overall dimensions of the apparatus to be reduced and the likelihood of interference between the motion device and other parts of the apparatus, or of other apparatuses, to be avoided, or in any case noticeably reduced.

Conveniently, the laying element may comprise a laying roller rotatable about a rotation axis.

Advantageously, in order to ensure a good adhesion of the strip-like element on the toroidal support, the laying roller may have a width equal to at least 0.8 times the width L of the said rubberized strip-like element.

Such a choice ensures that, during the laying, the laying element presses the rubberized strip-like element against the outer surface of the toroidal support substantially over the entire width of the strip-like element itself.

Typically, the control device comprises at least one microprocessor.

Besides the already mentioned advantages, the process and apparatus according to the invention allow:
- defining arbitrarily point by point a laying path of the rubberized strip-like element, so as to change, for example, the laying angle of the reinforcing elements of the belt layer with respect to the equatorial plane, based on the performances that this variation may ensure to the tyre;
- obtaining a high flexibility and automation of the system, which is suitable for use in a production plant with high production mix, i.e. tyres with a different curvature or with reinforcing structures crossed according to different laying angles.

BRIEF DESCRIPTION OF THE FIGURES

Further features and advantages of the invention shall now be presented with reference to embodiments shown as non-limiting examples in the accompanying figures, wherein.

DETAILED DESCRIPTION OF EMBODIMENTS OF THE INVENTION

Figure 2:
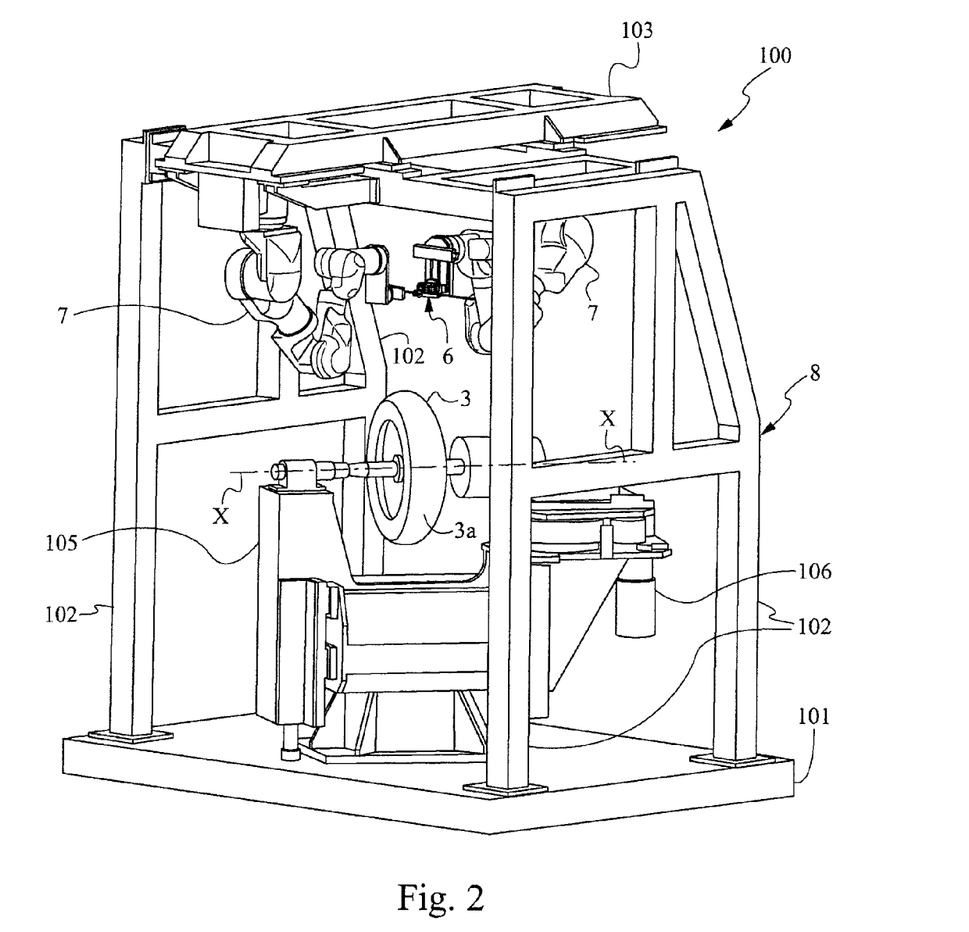
FIG. 2 schematically shows in a perspective view an embodiment of an apparatus which can be used in a process according to the present invention.

In FIG. 2 an exemplary embodiment of an apparatus which can be used in a process for manufacturing a tyre for vehicles, according to a preferred way of carrying out the present invention, is generally indicated with reference numeral 100.

In particular, the apparatus 100 is used in a step of building a reinforcing structure of a motorcycle tyre.

In particular, the apparatus 100 is used in a step of building a reinforcing structure of a motorcycle tyre 10 characterised by a curvature ratio greater than 0.2, preferably in the range between 0.2 and 0.8.

In detail, in the case of a motorcycle tyre intended to be mounted on the rear wheel the curvature ratio is preferably between 0.25 and 0.35, while for motorcycle tyres intended to be mounted on the front wheel the curvature ratio is preferably between 0.35 and 0.7.

Figure 1:
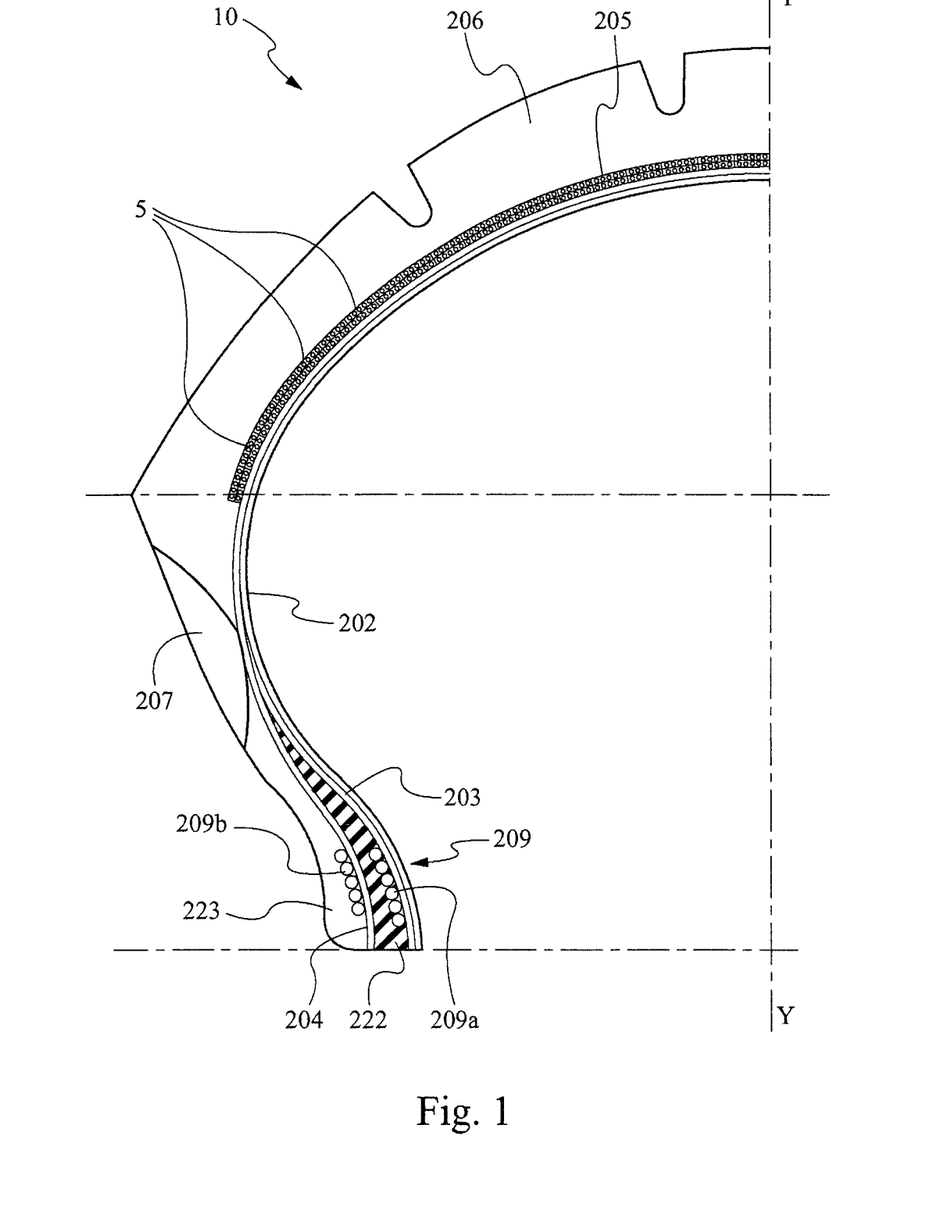
FIG. 1 schematically shows a half-section perpendicular to the equatorial plane of an embodiment of a motorcycle tyre which can be manufactured by means of the process according to the present invention.

Referring to FIG. 1, such tyres typically have a carcass structure formed by at least one carcass layer 202.

The carcass layer 202 has a substantially toroidal configuration and engages, by means of its opposite circumferential edges, at least one annular reinforcing structure 209, so as to form a structure usually identified as "bead".

In the preferred embodiment shown in FIG. 1 the carcass layer comprises a first plurality of strips 203 and a second plurality of strips 204 made of an elastomeric material, comprising reinforcing elements, which are arranged in an alternating way along the profile of a structure with a substantially toroidal development, according to a reversed U configuration so as to be adjacent in the crown region and substantially superimposed in the bead region.

The reinforcing elements, included in the carcass layer 202, preferably comprise textile cords selected from those usually adopted in the manufacturing of tyre carcasses, for example nylon, rayon, aramid, PET, PEN, with an elementary thread having a diameter between 0.35 mm and 1.5 mm. The reinforcing elements in the carcass layer 202 are preferably arranged in a radial direction, i.e. according to an angle between 70° and 110°, more preferably between 80° and 100°, with respect to the equatorial plane Y-Y.

In the embodiment shown in FIG. 1, the annular reinforcing structure 209 has at least one annular insert obtained by means of an elongate, preferably metallic, element, at least partially coated with elastomeric material, arranged in substantially concentric coils, each coil being defined either by a segment of a continuous spiral or by concentric loops formed by respective metal cords.

Preferably, as shown in FIG. 1, two annular inserts 209a and 209b, and a filling 222 made of elastomeric material at an axially outer position with respect to the first annular insert 209a are provided. The second annular insert 209a, still as shown in FIG. 1, is arranged in an axially outer position with respect to the strips 204. Finally, in an axially outer position with respect to said second annular insert 209b, and not necessarily in contact therewith, a further filling 223 is provided, which finishes the manufacture of the annular reinforcing structure 209.

In an alternative embodiment, not shown, a carcass structure has its opposite lateral edges associated with conventional annular reinforcing structures called bead rings. The association of the carcass layer with the bead rings, in this case, is obtained by turning back the opposite lateral edges of the carcass layer about the same bead rings, so as to form the so called carcass turn-ups. The carcass structure may also comprise more carcass layers.

Circumferentially applied onto the carcass structure, in a radially outer position, there is a belt structure 205, onto which a tread band 206 is circumferentially superimposed. On the tread band 206, further to a moulding operation performed during the vulcanisation of the tyre, longitudinal and/or transverse grooves may be formed, arranged so as to define a desired tread pattern.

The tyre 10 may comprise a pair of sidewalls 207 laterally applied to said carcass structure on opposite sides.

The belt structure 205 which is formed by means of the process according to the present invention, generally known under the name of crossed belt, has at least a first and at least a second radially superimposed reinforcing layers.

Each reinforcing layer has a circumferential extension about a rotation axis of the tyre and comprises a plurality of strip-like elements 5 arranged in a side-by-side relationship.

Each rubberized strip-like element 5 in turn comprises a plurality of thread-like reinforcing elements, typically textile or possibly metallic elements, at least partially coated with at least one layer of elastomeric material, arranged substantially parallel to one another and to a longitudinal direction of the rubberized strip-like element 5 itself.

Preferably, said thread-like textile reinforcing elements are made of a synthetic fibre, preferably a high-modulus synthetic fibre, for example an aramid synthetic fibre (aromatic amide fibre—for example Kevlar® fibres).

Each rubberized strip-like element has a dimension (length) prevailing with respect to the other two dimensions (width and thickness). In particular, the strip-like elements preferably have a length between 5 mm and 25 mm.

Preferably, the strip-like elements have a thickness between 0.5 mm and 2 mm.

Preferably, the strip-like elements have a number of reinforcing thread-like elements or cords between 4 and 40 with a density preferably between 60 and 130 cords per decimeter.

Each reinforcing layer thus comprises a plurality of tread-like reinforcing elements, arranged substantially parallel to one another.

The reinforcing layers are arranged, in the belt structure 205, so that the reinforcing thread-like elements of the first reinforcing layer are oriented obliquely with respect to the equatorial plane (Y-Y) of the tyre, and the reinforcing thread-like elements of the second reinforcing layer also have an oblique orientation, but crossed with respect to the thread-like elements of the first layer.

The apparatus 100 according to the embodiment shown in FIG. 2 comprises a support frame 8 with a base 101 provided, in a central position, with a toroidal support 3 having an outer surface 3a on which the belt structure will be formed.

A toroidal support 3 suitable for the process hereinafter described may have for example a curvature ratio greater than 0.15, preferably greater than 0.18-0.20.

The toroidal support 3 is mounted rotatably about a rotation axis X-X in a fully conventional way. The structure of the support 3 is not described in detail here, as it can be designed in any suitable way by a person skilled in the art.

Moreover, the belt structure may be built directly onto the carcass structure. In this case the carcass structure carries out the function of the toroidal support.

The toroidal support 3 is supported by bearing members 105 and moved by motion members 106.

The bearing members 105 and the motion members 106 of the toroidal support 3 will not be described in detail, as they are fully conventional.

Furthermore, four vertical uprights 102 extend vertically from the base 101, at the four opposite corners of the base 101.

The vertical uprights 102 support in turn an upper portion or transverse bridge 103, to which at least one motion device 7 for a laying element 6 is fixed.

In the embodiment shown in FIGS. 2-6 there are two motion devices 7 which extend from the transverse bridge 103 above the toroidal support 3.

The motion devices 7 are represented by two robot arms of the anthropomorphic type, each movable with six degrees of freedom.

The free end of the robot arm, i.e. the end not fixed to the transverse bridge 103, supports a laying element 6.

The motion devices 7 and thus the laying devices 6 are arranged facing each other and opposite to each other with respect to the toroidal support 3, in particular facing each other and opposite to each other with respect to the equatorial plane of the toroidal support 3.

The movement of the motion devices 7 causes the movement of the laying devices 6.

The motion devices 7 can be moved away from each other.

Preferably, the movement of the motion devices 7 is controlled so as to be carried out in synchronism and symmetrically with respect to the laying starting point.

Advantageously, the motion elements 7 can be moved independently from each other.

A laying element 6 is intended to support the rubberized strip-like element 5 to be laid and cooperates with the motion devices 7 for bringing it in contact with the outer surface 3a of the toroidal support 3 and for guiding its deposition on the same outer surface 3a.

The laying element 6 comprises a laying surface adapted to act on a portion of the rubberized strip like-element for laying the same on the toroidal support 3.

In the embodiment shown in FIGS. 2-6, each laying element 6 comprises at least one laying roller 9, at least one opposite roller 12 and a guide rail 11.

The laying roller 9 is intended to exert, during the laying, a pressure on the rubberized strip-like element 5 so that the same adheres to the outer surface 3a of the toroidal support 3 according to a predetermined laying path.

In the embodiment shown in FIGS. 2-6, the portion of the laying roller 9 which exerts the pressure on the rubberized strip-like element 5 represents the aforesaid laying surface of the laying device 6.

Figure 6:
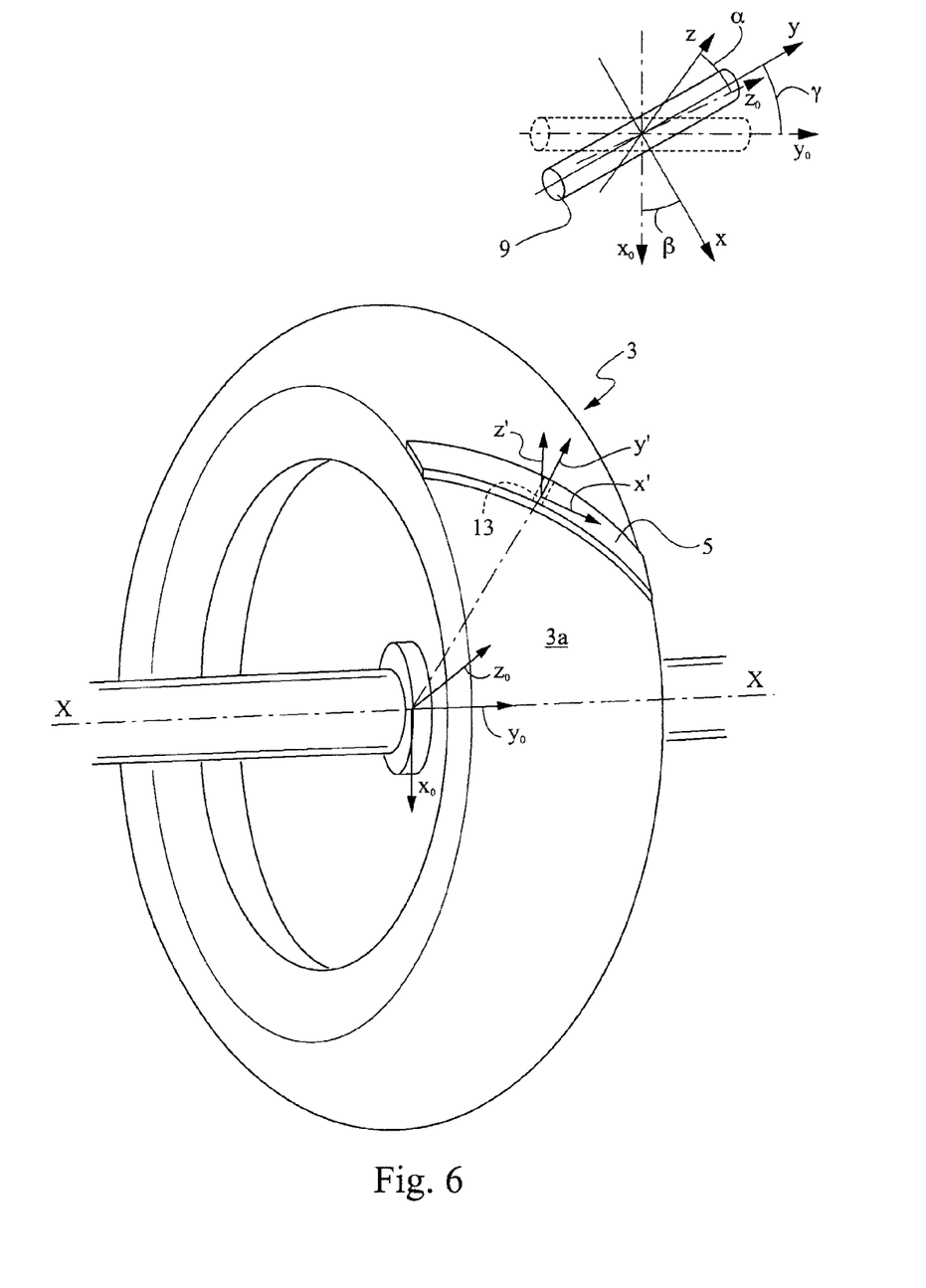
FIG. 6 shows in a schematic simplified view a laying roller of a laying element and a toroidal support adapted to carry out the process according to the present invention.

In particular the laying surface is represented by the portion of the outer surface of the laying roller 9 which contacts the portion of rubberized strip-like element 5 at the moment of the deposition thereof.

The laying roller 9 is mounted rotatably and idly about a rotation axis and extends in the direction of the rotation axis over a width preferably equal to at least 0.8 times the width the strip-like element 5, more preferably over at least the whole width of the rubberized strip-like element 5.

The opposite roller 12 is intended to hold, during the laying of the rubberized strip-like element 5 and in cooperation with the laying roller 9, the rubberized strip-like element 5.

Also the opposite roller 12 is mounted rotatably and idly about a rotation axis, parallel to the rotation axis of the laying roller 9, and extends in the direction of its rotation axis preferably over a width greater than the width of the laying roller 9.

The opposite roller 12 is arranged between the laying roller 9 and the guide rail 11.

The guide rail 11, adjacent to the opposite roller 12, is dimensioned to accommodate the rubberized strip-like element 5 to be laid.

For this purpose, the guide rail 11 has a groove dimensioned to accommodate the rubberized strip-like element 5 to be laid.

The space position of the laying element 6, and particularly that of the laying roller 9, can be identified by a coordinate triad of a point of said laying element and by a space orientation of said laying element in a predetermined frame of reference.

Preferably, according to the embodiment shown in the figures and referring particularly to FIG. 6, the space orientation of the laying element 6 is defined by three angles: roll ($\alpha$), pitch ($\beta$) and yaw ($\gamma$).

In the embodiment schematically shown in FIG. 6 the roll ($\alpha$), pitch ($\beta$) and yaw ($\gamma$) of said laying element 6, and particularly of the laying roller 9, are measured using a triad of Cartesian axes: x, y, z with the origin in the centre of the laying roller 9 and arranged, according to one of the possibilities, so that the y-axis coincides with the width direction of the laying element, the x-axis is perpendicular to the y-axis in a plane parallel to the laying plane and the z-axis is perpendicular to said plane. By pitch ($\beta$) of the laying element it is meant the rotation angle of the laying element about the y-axis, by yawning-angle yaw ($\gamma$) of the laying element it is meant the rotation angle of the laying element about the z-axis, by roll ($\alpha$) of the laying element it is meant the rotation angle of the laying element about the x-axis.

Each of said angles may be measured between the directions of the x-, y-, z-axis associated with the laying element 6 and the directions of a triad of reference Cartesian axes $x_0$, $y_0$, $z_0$ positioned, for example, in the centre of the toroidal support 3.

For controlling the movement of the motion devices 7 and thus of the laying element 6, the apparatus 100 further has a microprocessor, such as an industrial processor or a PLC, not shown in the figure.

The microprocessor as well as its interfaces with the motion devices 7 will not be described, as they are fully conventional.

The apparatus 100 further comprises at least one device adapted to feed strip-like elements 5 of a predetermined length.

The provision of the rubberized strip-like elements 5 is carried out by means of cutting operations carried out on at least one continuous ribbon-like element, not shown in the figures, which incorporates the thread-like elements in the layer of elastomeric material.

The feeding device, not shown in the figure, may be designed in any suitable way by the person skilled in the art.

As an example, the feeding device may be of type comprising at least one cutting member adapted to cut the continuous ribbon-like element according to predetermined lengths and inclinations with respect to the longitudinal extension of the same, to obtain individual strip-like elements 5.

The cutting member is usually arranged laterally to the toroidal support 3. In particular, in an embodiment, the cutting member is arranged with respect to the toroidal support on the same side from which the continuous ribbon-like elements comes.

The feeding device may further be provided with at least one grip member combined with the cutting member.

The grip member is intended to grasp an end of the continuous ribbon-like element for pulling it to a work position radially above the toroidal support 3 and spaced apart from the cutting member by a distance greater than the length of the rubberized strip-like element 5 to be laid.

Preferably, before carrying out the manufacturing of the belt structure, a carcass structure (non shown in the drawings) is applied on the toroidal support 3, which carcass structure can be conveniently formed on the same toroidal support 3.

Alternatively, the carcass structure might be separately manufactured and associated, during the conformation step, with the belt structure manufactured instead on the toroidal support.

Figure 7:
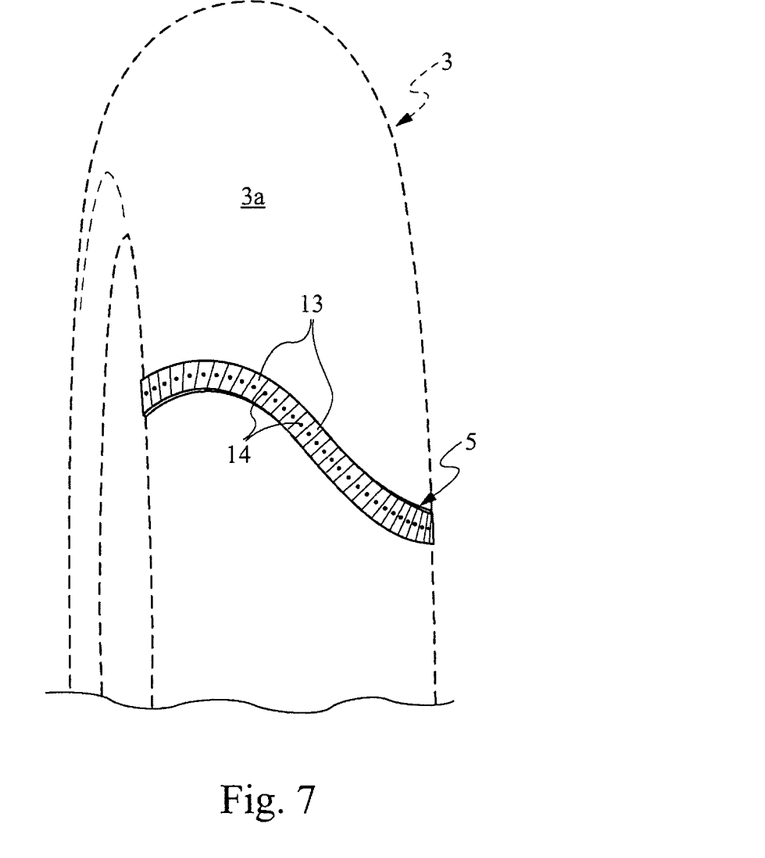
FIG. 7 schematically shows a sequence of positioning polygons associated with a laying path of a strip-like element of the process according to the present invention.

For carrying out the process according to the present invention, it is first determined for each rubberized strip-like element 5 to be laid at least one laying path on the outer surface 3a of the toroidal support 3 as shown in FIG. 7.

The laying path is defined by a sequence of predetermined points 14 selected on as many positioning polygons 13. The position of each of said positioning polygons 13 is in turn defined by means of an orientation with respect to a frame of reference and a coordinate triad of its respective predetermined point 14 with respect to said frame of reference.

The sequence of positions and orientations of a positioning polygon 1 is thus associated with the laying path of the rubberized strip-like element 5 on the outer surface 3a of the toroidal support 3.

Each positioning polygon 13 represents a position of a rubberized strip-like element 5 to be laid on the toroidal support 3.

Figure 6A:
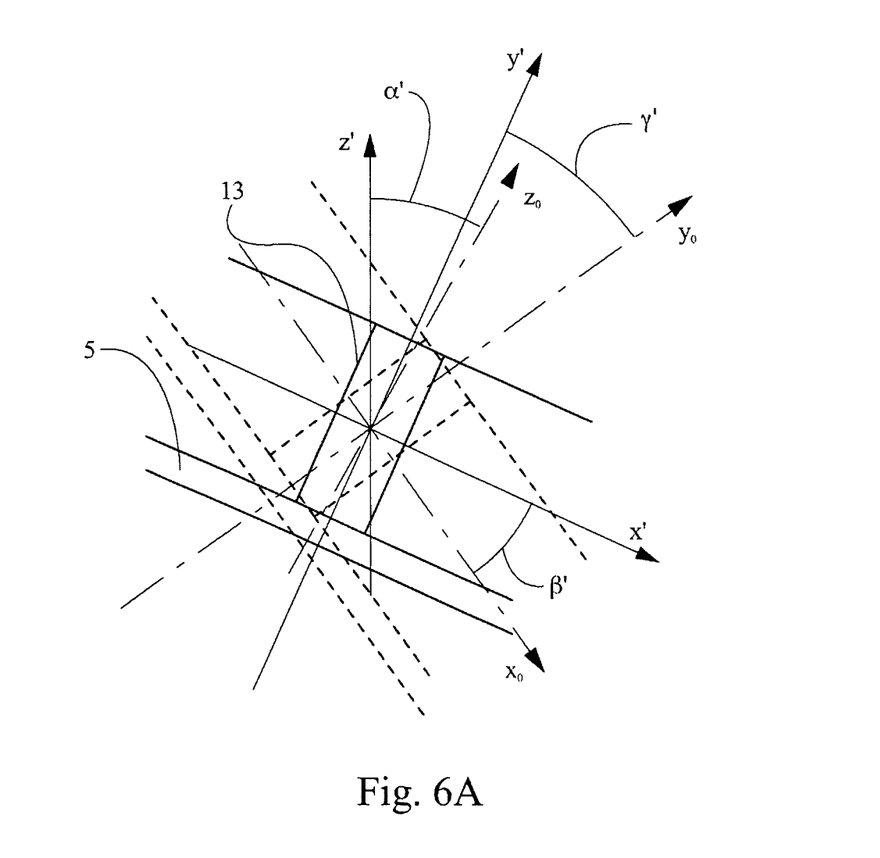
FIG. 6A schematically shows an enlarged view of a positioning polygon associated with a laying path of the process according to the present invention.

Referring in particular to FIGS. 6A and 7, the roll ($\alpha'$), yaw ($\gamma'$) and pitch ($\beta'$) of each positioning polygon 13 are preferably referred to rotations of the positioning polygon definable by means of a triad of Cartesian axes $x'$, $y'$, $z'$, associated with the positioning polygon.

As an example, the $y'$-axis coincides with the transverse direction (perpendicular to the laying path), the $x'$-axis is perpendicular to the $y'$-axis in the plane defined by the positioning polygon, and the $z'$-axis is chosen to be perpendicular to both the $x'$-axis and the $y'$-axis. The origin of the axis frame is preferably set in the centroid of said positioning polygon.

By pitch ($\beta'$) of the positioning polygon it is meant the rotation angle of the positioning polygon about the $y'$-axis, by yaw ($\gamma'$) of the positioning polygon it is meant the rotation angle of the positioning polygon about the $z'$-axis and by roll ($\alpha'$) of said positioning polygon it is meant the rotation angle of the positioning polygon about the $x'$-axis.

Each of said angles ($\alpha'$), ($\beta'$) and ($\gamma'$) may be measured between the directions of the axes $x'$, $y'$, $z'$ associated with the positioning polygon 13 and the directions of a triad of reference Cartesian axes $X_0$, $y_0$, $z_0$ positioned, for example, in the centre of the toroidal support 3.

Such triad of Cartesian axes $x_0$, $y_0$, $z_0$ is preferably positioned in the centre of the toroidal support so that the $y_0$-axis coincides with the rotation axis of the toroidal support.

The process according to the invention provides for the grip element to grasp an end of the continuous ribbon-like element near the cutting member, for pulling it to an operating position.

The operating position is located above the toroidal support 3 and spaced from the cutting member by a distance greater than the length of the rubberized strip-like element 5.

In this step the laying roller 9 and the opposite roller 12 of each laying element 6 which are in an open position, i.e. they are mutually spaced apart in the radial direction with respect to the toroidal support 3, are brought close to each other so as to engage the continuous ribbon-like element and to clamp it between them.

The cutting member is then operated for cutting a rubberized strip-like element 5 of a predetermined length from the ribbon-like element.

The rubberized strip-like element 5 so obtained is held by the two laying elements 6 in a centred position above the equatorial plane of the toroidal support 3.

Each cutting operation is followed by the laying of the obtained individual strip-like element 5 on the toroidal support 3.

Figure 3:
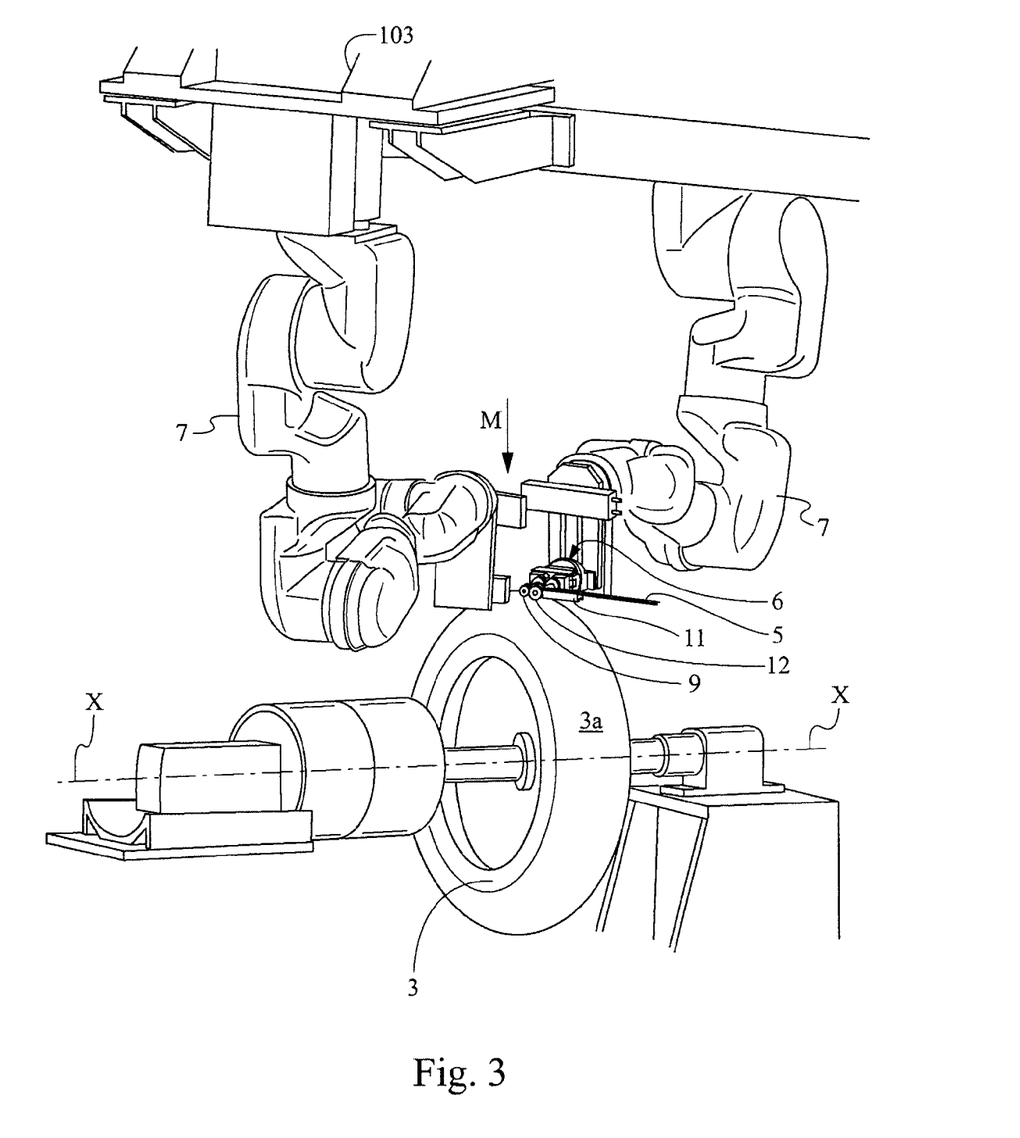
FIG. 3 schematically shows a first step of the process according to the present invention in which a rubberized strip-like element is brought near to a toroidal support.

For this purpose, as shown by arrow M in FIG. 3, the laying elements 6 are moved together with the rubberized strip-like element 5 to be laid towards the toroidal support 3 until at least a portion of the rubberized strip-like element 5 to be laid contacts the outer surface 3a of the toroidal support 3.

The step of moving the laying elements 6 towards the toroidal support 3 is carried out so as to bring a substantially central portion of the rubberized strip-like element 5 into contact with a portion of the outer surface 3a of the toroidal support 3, substantially straddling its equatorial plane.

In detail, the substantially central portion of the rubberized strip-like element 5 is brought into contact with a portion of the outer surface 3a of the toroidal support 3 substantially straddling its equatorial plane and according to a predetermined orientation or angle with respect to the equatorial plane of the same toroidal support 3.

Figure 4:
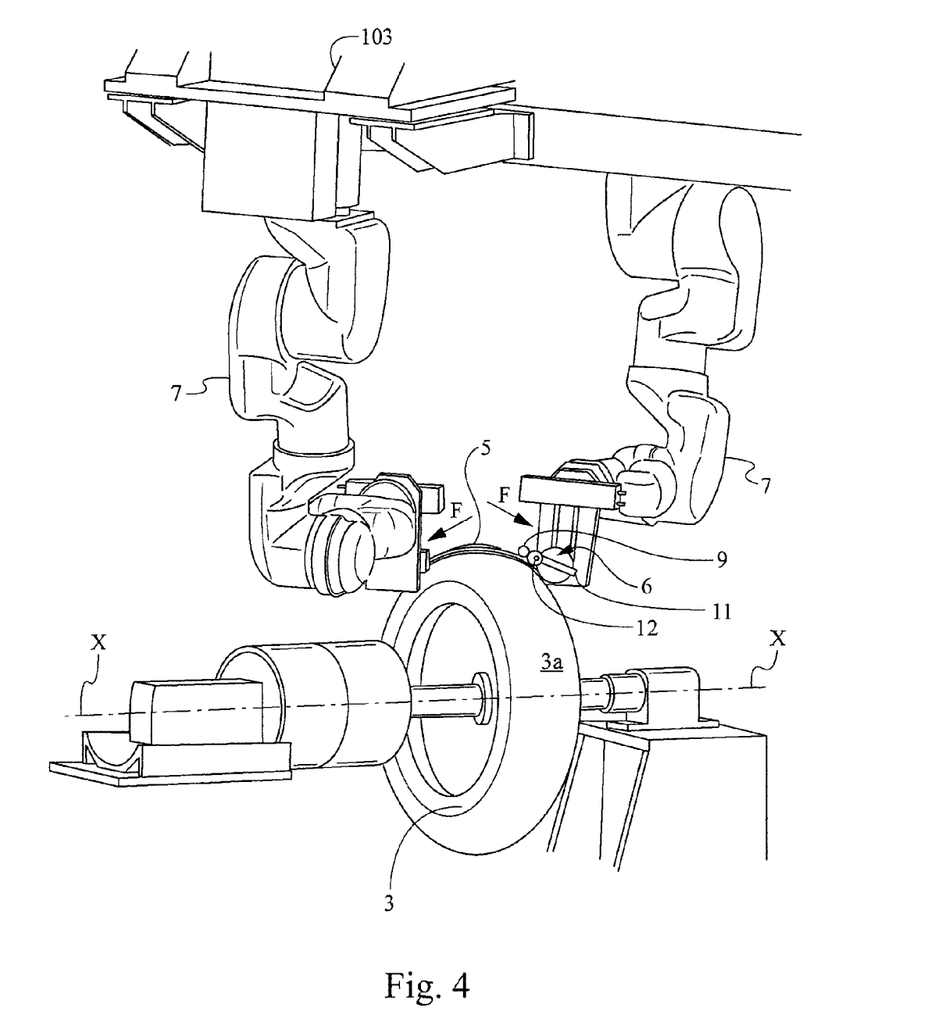
FIG. 4 schematically shows a second step of the process according to the present invention in which a rubberized strip-like element is laid on a toroidal support.
Figure 5:
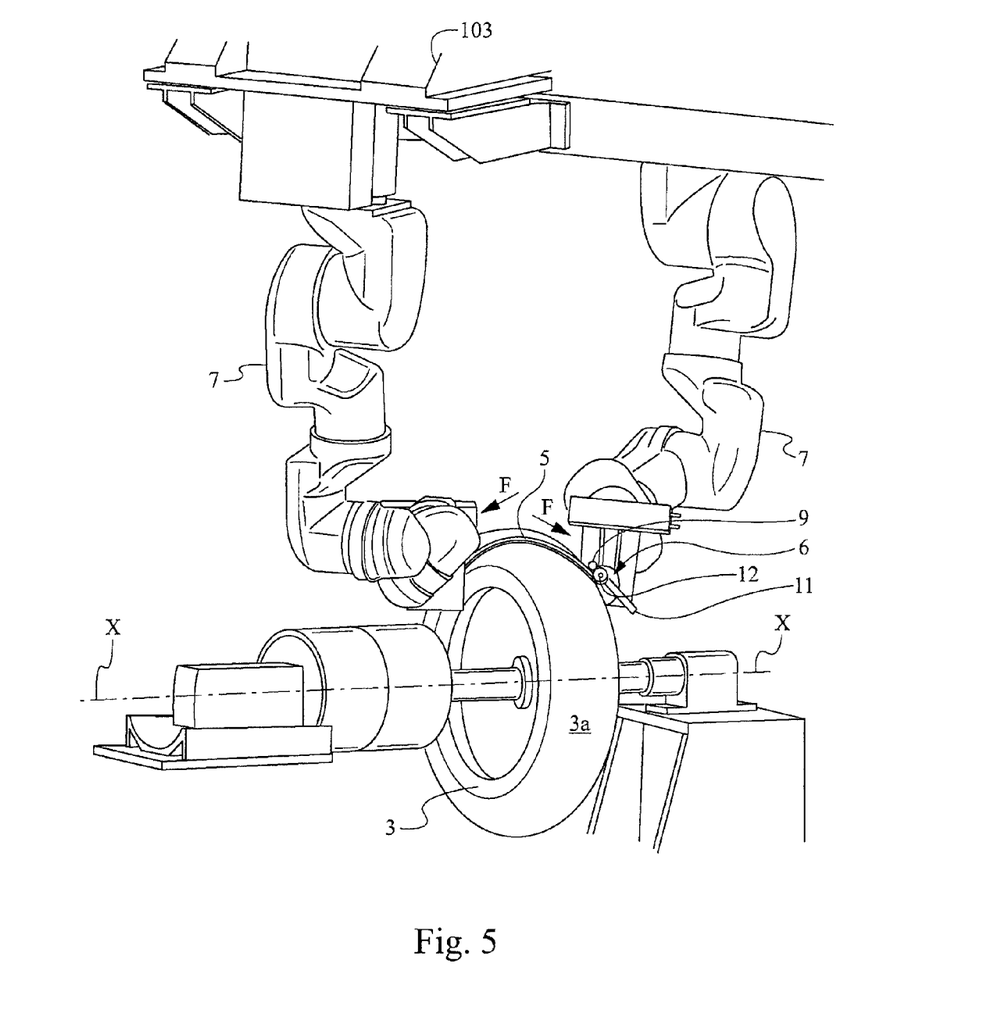
FIG. 5 schematically shows a step of the process according to the present invention subsequent to that shown in FIG. 4.

In FIGS. 4 and 5 it is shown how the laying elements 6 are then moved, away from the equatorial plane of the toroidal support 3 towards the respective shoulder portions of the toroidal support itself, according to the direction indicated by arrows F.

For making the rubberized strip-like element 5 adhere to the toroidal support 3, each laying element 6 is moved by means of the corresponding robot arm 7, so as to match the predetermined laying path, defined on the same outer surface 3a of the support 3, with the space position of the laying element 6 and thus of the rubberized strip-like element 5.

During the movement of the laying element 6, for each position of the path defined on the outer surface 3a of the toroidal support 3 the orientation of the laying element 6 is changed, so as to substantially match a sequence of positions of the laying surface of the laying element 6 with the sequence of positions of the positioning polygons, which is associated with the laying path.

In particular, the orientation of the laying element 6 is controlled so that the laying surface of the laying element 6 substantially coincides with (or is parallel to) the plane tangent to the surface 3a of the toroidal support 3 in each predetermined point of the laying path.

Conveniently, as shown in FIG. 6, during the movement of the laying element 6, for each position of the positioning polygons 13 corresponding to a respective position of the rubberized strip-like element 5, the roll ($\alpha$), and/or pitch ($\beta$) and/or yaw ($\gamma$) angles of the laying element 6 are changed in a controlled way (imposing on the latter the desired angle), so that they are substantially the same as the roll ($\alpha'$), pitch ($\beta'$) and yaw ($\gamma'$) of the predetermined positioning polygon 13 of the rubberized strip-like element 5.

During such step, the movement of the laying rollers 9 makes the laying of the rubberized strip-like element to sequentially and continuously match the predetermined laying path.

By controlling the orientation, the movement of the laying rollers 9 can follow the curvature of the toroidal support 3 precisely.

The laying may be carried out exerting a pressure on the outer surface 3a of the toroidal support 3 substantially from the central portion of the rubberized strip-like element 5 up to an end of the strip-like element itself.

Advantageously, for making the rubberized strip-like element 5 adhere to the outer surface 3a of the toroidal support 3, each laying element 6, and particularly the laying roller 9, exerts a pressure on the outer surface 3a of the toroidal support 3 substantially over the whole width of the rubberized strip-like element 5.

The movement of the laying element 6 is such that at the adhesion area between strip-like element 5 and toroidal support 3, the laying roller 9 is oriented substantially tangent to the curvature of the same toroidal support 3, both in the circumferential and in the axial direction.

When the laying of a rubberized strip-like element 5 is terminated, the apparatus prepares for the laying of the subsequent rubberized strip-like element 5, substantially by rotating the toroidal support 3 by a predetermined angular pitch. This pitch is typically related to the circumferential distribution pitch of the strip-like elements 5.

The previous steps are then repeated until at least a first belt layer having a continuous circumferential development about a geometric rotation axis X-X of the toroidal support 3 is completed.

When the laying of the strip-like elements 5 adapted to form the first belt layer is finished, the previous steps are repeated until at least a second belt layer is completed.

The layers are arranged so that the reinforcing thread-like elements of the first belt layer are oriented obliquely with respect to the equatorial plane of the tyre, and the reinforcing thread-like elements of the second belt layer also have an oblique orientation, but crossed with respect to the thread-like elements of the first layer.

The belt structure manufactured by means of the process according to the present invention may further have more layers laid according to different angles, whose manufacturing may be carried out respectively in substantially the same way as that of the first two layers.

The apparatus 100 described above can be used in a process for producing a tyre for vehicle wheels for manufacturing a belt structure.

Although the apparatus 100 has been described particularly with reference to the production of a tyre for motorcycles, because of the aforesaid problems related to the curvature of the toroidal support on which the belt structure is laid, the Applicant has realized that the possibility to change and control the position and orientation of a laying element during the laying of a reinforcing layer allows the laying of any reinforcing layer on any kind of toroidal support or tyre precursor, with the advantageous possibility of following laying paths adapted to the use and shape of the tyre.

The present invention has been described with reference to some embodiments thereof. Many modifications can be made in the embodiments described in detail, still remaining within the scope of protection of the invention, defined by the following claims.

The invention claimed is:

1. A process for manufacturing a reinforcing structure of a tyre for a vehicle wheel, on a toroidal support comprising an outer surface, by means of laying elements, each laying element comprising a laying surface adapted to act on a portion of a rubberized strip-like element for laying the rubberized strip-like element on the outer surface of the toroidal support, wherein:
   said reinforcing structure comprises at least first and second radially superimposed reinforcing layers,
   each reinforcing layer comprises reinforcing thread-like elements, and
   said reinforcing layers are arranged so that the reinforcing thread-like elements of the first reinforcing layer are oriented obliquely with respect to an equatorial plane of the tyre, and the reinforcing thread-like elements of the second reinforcing layer also have an oblique orientation, crossed with respect to the thread-like elements of the first layer;
   the process comprising:
   a) providing the rubberized strip-like element, in preparation of it being laid on the outer surface of the toroidal support, said rubberized strip-like element comprising a number of said reinforcing thread-like elements of the first reinforcing layer arranged in parallel to each other;
   b) predetermining for the strip-like element to be laid, a laying path on the outer surface of the toroidal support, said laying path being defined by a sequence of predetermined points, each predetermined point selected on a respective positioning polygon, said laying path being associated with a positioning sequence of said positioning polygons, the positioning of each positioning polygon in said sequence being defined by an orientation of said respective positioning polygon with respect to a frame of reference and by a coordinate triad of the respective predetermined point thereof in said frame of reference;
   c) moving said laying elements together with the rubberized strip-like element to be laid toward the toroidal support until a portion of the rubberized strip-like element to be laid contacts the outer surface of the toroidal support;
   d) laying said rubberized strip-like element by moving said laying elements along the outer surface of the toroidal support, controlling the orientation and position of said laying elements, so as to match a sequence of positions and orientations of said laying surface of the laying elements with said positioning sequence of said positioning polygons associated with said predetermined laying path;
   e) rotating the toroidal support by a predetermined angular pitch, for making said toroidal support ready for laying a new rubberized strip-like element; and
   f) repeating steps a) to e) for the new strip-like element;
   wherein the laying elements are moved by respective independent motion devices along respective laying paths that are symmetrical to one another with respect to a laying starting point, the movements of the laying elements along their respective symmetrical paths being temporally shifted in laying time with respect to one another.

2. The process according to claim 1, wherein the tyre is a tyre for a motorcycle wheel having a curvature ratio equal to at least 0.2.

3. The process according to claim 1, wherein each position of the matched sequence of positions and orientations of said laying surface of each respective laying element is defined by a coordinate triad of a point of said respective laying element with respect to the frame of reference and by a space orientation of said respective laying element.

4. The process according to claim 1, wherein the orientations of the polygons in the positioning sequence are predetermined so that during the laying, said laying surface of each laying element coincides with a plane tangent to the outer surface of the toroidal support at respective predetermined points of the predetermined laying path.

5. The process according to claim 3, wherein the space orientation of each laying element is defined by three angles: roll, pitch, and yaw.

6. The process according to claim 5, wherein during movement of said laying elements for each position of the respective positioning polygons defined on the outer surface of the toroidal support, the roll, pitch, and yaw of the laying elements are changed in a controlled way so as to be the same as a roll, pitch, and yaw of said respective positioning polygons.

7. The process according to claim 1, wherein moving said laying elements toward the toroidal support is carried out so as to place, according to a predetermined orientation, a central portion of the rubberized strip-like element to be laid in contact with a portion of the outer surface of the toroidal support straddling an equatorial plane of the toroidal support.

8. The process according to claim 1, wherein, during the laying of said rubberized strip-like element, said laying elements are moved away from an equatorial plane of the toroidal support.

9. The process according to claim 1, wherein during application of said rubberized strip-like element, said laying elements exert pressure on at least a portion of said rubberized strip-like element.

10. The process according to claim 1, wherein during the laying of said rubberized strip-like element, each laying element is moved away from an equatorial plane of the toroidal support following a curvature of the toroidal support and exerting a pressure from a central portion of the rubberized strip-like element up to an end of the strip-like element.

11. The process according to claim 1, wherein the laying of said rubberized strip-like element is carried out by two laying elements moved away from an equatorial plane of the toroidal support following a curvature of the toroidal support in directions opposite to each other.

12. The process according to claim 1, wherein each laying element is moved by a respective robot arm of an anthropomorphic type movable with six degrees of freedom.

13. The process according to claim 1, wherein said toroidal support has a curvature greater than 0.15.

* * * * *